US006732300B1

(12) United States Patent
Freydel

(10) Patent No.: US 6,732,300 B1
(45) Date of Patent: May 4, 2004

(54) HYBRID TRIPLE REDUNDANT COMPUTER SYSTEM

(76) Inventor: Lev Freydel, 1544 Berendo Ave., Akron, OH (US) 44313

( * ) Notice: Subject to any disclaimer, the term of this patent is extended or adjusted under 35 U.S.C. 154(b) by 0 days.

(21) Appl. No.: 10/354,368

(22) Filed: Jan. 30, 2003

Related U.S. Application Data

(63) Continuation-in-part of application No. 09/506,849, filed on Feb. 18, 2000, now Pat. No. 6,550,018.
(60) Provisional application No. 60/421,487, filed on Oct. 25, 2002.

(51) Int. Cl.[7] .................................................. G06F 11/00
(52) U.S. Cl. ............................. 714/36; 714/36; 714/10; 714/11; 714/12; 714/13; 714/55
(58) Field of Search ........................... 714/36, 10, 11, 714/12, 13, 55

(56) References Cited

U.S. PATENT DOCUMENTS

| | | | |
|---|---|---|---|
| 3,681,578 A | 8/1972 | Stevens | 714/11 |
| 4,583,224 A | 4/1986 | Ishii et al. | 714/10 |
| 4,616,312 A | 10/1986 | Uebel | 714/11 |
| 4,622,667 A | 11/1986 | Yount | 371/9 |
| 4,726,026 A | 2/1988 | Hilford et al. | 371/25 |
| 4,868,826 A | 9/1989 | Smith et al. | 371/9.1 |
| 4,967,347 A * | 10/1990 | Smith et al. | 714/12 |
| 5,084,878 A | 1/1992 | Kanekawa et al. | 371/36 |
| 5,271,023 A * | 12/1993 | Norman | 714/10 |
| 5,339,404 A | 8/1994 | Vandling, III | 395/575 |
| 5,349,654 A | 9/1994 | Bond et al. | 714/45 |
| 5,423,024 A | 6/1995 | Cheung | 714/11 |
| 5,452,441 A | 9/1995 | Esposito et al. | 714/13 |
| 5,530,946 A | 6/1996 | Bouvier et al. | 395/182.21 |
| 5,533,188 A * | 7/1996 | Palumbo | 714/4 |
| 5,537,583 A | 7/1996 | Truong | 395/550 |
| 5,550,736 A | 8/1996 | Hay et al. | 364/424.03 |
| 5,613,064 A | 3/1997 | Curtin | 395/184.01 |
| 5,630,046 A * | 5/1997 | Loise | 714/11 |
| 5,630,053 A | 5/1997 | Morikawa | 395/184.01 |
| 5,862,315 A | 1/1999 | Glaser et al. | 395/182.09 |
| 5,903,717 A * | 5/1999 | Wardrop | 714/12 |
| 5,907,671 A | 5/1999 | Chen et al. | 714/6 |
| 6,141,769 A | 10/2000 | Petivan et al. | 714/10 |
| 6,141,770 A | 10/2000 | Fuchs et al. | 714/11 |
| 6,240,526 B1 * | 5/2001 | Petivan et al. | 714/11 |
| 6,247,143 B1 * | 6/2001 | Williams | 714/11 |
| 2003/0163766 A1 * | 8/2003 | Urahama | 714/36 |

OTHER PUBLICATIONS

Frederickson, A.A., *Fault Tolerant Programmable Controllers For Saftey Systems*, ISA Transactions, vol. 29 (1990), pp. 13–17.

(List continued on next page.)

*Primary Examiner*—Robert Beausoliel
*Assistant Examiner*—Yolanda L. Wilson
(74) *Attorney, Agent, or Firm*—Renner, Kenner, Greive, Bobak, Taylor & Weber

(57) ABSTRACT

A hybrid multiple redundant computer system having redundant input modules, central processor modules, and output modules operating in parallel, where output circuits within each output module are connected to associated microcontrollers, such that, a first output circuit is connected to a first and a third microcontroller, a second output circuit is connected to a second and the first microcontroller, and a third output circuit is connected to the third and the second microcontroller; each output module further comprising watchdog controllers for detecting faults within the microcontrollers or central processing modules, where the watchdog controllers produce alarm signals upon detection of a failure within these components; the output circuits further including means for providing a 2-of-3 vote among data produced by three central processor modules if alarm signals are not activated and for reverting to a 2-of-2 and 1-of-1 vote in the presence of one and two faulty components respectively. The microcontrollers further including fault diagnostic and fault recovering means to provide correct system outputs in the presence of up to at least two faulty components in the output circuits.

8 Claims, 4 Drawing Sheets

OTHER PUBLICATIONS

Goble, W.M., *Control Systems Safety Evaluation and Reliability*, ISA (1998), pp. 364–375.

Pradhan, D.K., *Fault–Tolerant Computer System Design*, Prentice PTR (1996), pp. 9–11, 19–21, and 63–65.

Freydel et al., *A Cost Effective Hybrid Redundancy Scheme For Fault Tolerance and Reliability of Control Systems*, Proceedings of JCIC, vol. 4 (1998), pp. 142–146.

Beckman, L. *Safety Performance vs. Cost Analysis of Redundant Architectures Used in Safety Systems*, Advances in Instrumentation and Control, ISO/96 Conference, ISA, vol. 50, Part 1 (1996), pp. 372–375.

Bukowski, I.V. and Goble, W.M., *Comparing Control Systems' Reliability: Architecture, Diagnostic, and Commom Cause*, Proceedings of ISA/94 Conference and Exhibit ISA (1994).

Goble, W.M., *Saftey of Programmable Electronic Systems: Critical Issues, Diagnostic, and Common Cause*, Proceedings of the Fourth Conference on Advances in Process Control, York, UK (1995), pp. 3–7.

ISA—84.01—1996, Standard: *Application of Safety Instrumented Systems for the Process Industries*, pp. 15–25, 70–72 (1996).

\* cited by examiner

HYBRID TRIPLE REDUNDANT COMPUTER SYSTEM

RELATED APPLICATIONS

The present application is a continuation in part of Application Ser. No. 09/506,849 filed Feb. 18, 2000 now U.S. Pat. No. 6,550,018.

TECHNICAL FIELD

The present invention relates generally to computer systems devoted to safety-critical and critical-control applications. More particularly, the present invention relates to hybrid multiple redundant systems that combine majority voting with fault diagnostic and fault recovering means to provide correct outputs of a system in the presence of multiple system component faults.

BACKGROUND OF THE INVENTION

Real time data acquisition and control systems often operate in mission critical applications where the computations are critical to human safety, environmental cleanliness, or equipment protection. Examples include industrial controllers, high-speed trains, nuclear power plants, military systems, and hospitals. Computing systems devoted to such applications must provide fault tolerance since faulty computations in these systems can cause the loss of human life and/or expensive equipment. Redundant configuration of computing systems has been used in several research and design projects to provide system fault tolerance, which is the ability of a system to continue to perform its task after the occurrence of faults. A system failure that occurs as a result of a system component fault can be either safe or dangerous. A safe failure occurs when a system has failed into a safe state, or in other words, where the system does not disrupt the operation of other systems or compromise the safety of personnel associated with the system. The safe failure occurs, for example, when an emergency shutdown system (ESD) fails in such a way that it causes a shutdown not associated with the controlled process. A dangerous failure is a failure that prevents the system from responding to hazardous situations, allowing hazards to develop. For instance, a dangerous failure occurs when the ESD cannot perform a required shutdown.

Most deployed critical control systems are based on either triple modular redundant (TMR) or dual redundant (DR) architecture to achieve fault tolerance and increase safety and reliability. Each of these systems, however, typically tolerates the fault of only one system resource. If, for example, the TMR system is used as an Emergency Shutdown system, its outputs will be in an ON condition under normal operation and in an OFF state for a shutdown. If, for instance, two output modules of the TMR fail at the same time, in such a way that their outputs remain in an OFF condition, then the system fails safely, making a false shutdown. On the other hand, when two output modules fail in such a way that their outputs remain in an ON state, it can lead to a dangerous system failure. This failure is termed dangerous because, despite a process problem, the process cannot shut down.

To compensate for the TMRs inability to tolerate more than one controller failure, quick fault detection must be used to minimize the period of time that the system operates in a vulnerable condition. Commercial versions of TMR offer online module replacement and repair capability to address this problem. However, if one controller of the TMR fails and it has not been replaced, the next controller fault can lead to a system safe or dangerous failure. Thus, the success of online repair depends on the user's ability to discover and diagnose the problem in a short time period. Since fault discovery and repair rate are limited by many reasons, even a single controller failure may bring the system to a vulnerable mode.

As an alternative method of compensating for this vulnerability, known devices employ an output hot spare in an attempt to overcome the problem. That system has two triplicate I/O modules in parallel, where one module, a primary, is active, while the other module, a hot spare, is powered but inactive. Each output module usually includes three identical legs located in a single board. Under normal operation, hot spare module outputs are OFF so they do not affect the system output. If a fault is detected on the primary module, the control is automatically switched to the hot spare module, allowing the system to maintain 2-of-3 voting continuously. The faulty module can then be removed and replaced without process interruption.

The hot spare method reduces the probability of a safe failure within a TMR system. For example, when a safe failure occurs in any leg of primary output module that is discovered and the hot spare outputs are passed to the ON state allowing the system to maintain energized condition of system outputs. However, employing a hot spare adds to the number of components in the system increasing the overall system cost. As a further disadvantage, the hot spare is useless when the outputs of faulty modules remain in an ON state, and, thus, cannot prevent the occurrence of a dangerous system failure.

In many safe-critical and critical-control applications, where two faults and even more must be tolerated the TMR and DR systems cannot unfortunately be accepted. The Hybrid Multiple Redundant Computer (HMRC) system (FIG. 1), disclosed in copending patent application Ser. No. 09/506,849 dated Feb. 19, 2000, which is incorporated by reference herein, remains operational in the presence of two concurrent faults until they are detected. The HMRC system 10 contains three parallel operating processing units 12 each of each comprises input module 14, central processor module 16, and output module 50. The central processor module 16 is connected to the associated input module 14 and connected to primary and secondary output circuits 18, 20 located in the associated output module 50 and in the neighboring output module 50 respectively. Each processing unit 12 further includes a watchdog controller 30 that monitors the associated central processor module 16 and transfers an alarm signal 44 to each output module 50 in the event of a central processor module 16 failure. Primary and secondary output circuits 18, 20 in each output module 50 control an output voter network 22 and perform selectable but different logical functions among output data of the respective central processor and modules 16 and alarm signals 44. If alarm signals 44 are not activated, the system generates an output 180 using a two-of-three vote among output data produced by three central processor modules 16. In the event that one or two central processor modules 16 fail, the system is reconfigured to a two-of-two (2-of-2) and to a one-of-one (1-of-1) vote configuration respectively. Each central processor module 16 in turn monitors the status of the output modules and disables outputs of the output module 50 in the event that this module 50 fails. In general, the HMRC system remains operational in the face of as many as two component faults.

The HMRC system utilizes three alarm signals for each output module. It provides the system outputs reconfiguration from the 2-of-3 vote to the 2-of-2 and to the 1-of-1 vote in the presence of single or two faulty output modules respectively. If the HMRC system includes more than one set of the triplicated output modules, the system may use the same set of the three alarm signals for all of the triplicated output modules. In this case, however, a fault occurred in any one output module will lead to an undesirable reconfiguration of outputs in each set of the output modules even though these modules are still healthy. To overcome this problem, the system should be supplied by different alarm signals for each set of the triplicate output modules. The system should also have an associated means for activating only those alarm signals that are associated with the faulty output modules. However, the employ of the additional alarm signals requires the use of additional hardware and additional wires that increases the overall system cost. This disadvantage becomes especially considerable if the system includes a lot number of the remote output modules.

Another drawback of the HMRC system is that each CPM is connected to two output modules for transferring the same output data to each of them consequently. It decreases the throughput of the system since the CPM spends twice as much time for output data transfer.

SUMMARY OF THE INVENTION

An object of the present invention is, therefore, to provide an improved hybrid redundant computer system that has not the shortcomings of the existing redundant systems and it is able tolerate up to two faults. The system of the invention is called as Hybrid Triple Redundant Computer (HTRC) system.

In view of this object, the present invention generally provides a hybrid multiple redundant computer system including an input module included a first, a second, and a third input circuit operating in parallel; a first, a second, and a third central processor module operating in parallel, each of which is connected to the associated input circuit of said input module for receiving an input data from said input module and for using the input data as input to a control program to provide output data by execution of said control program; an output module including a first, a second, and a third microcontroller for receiving said output data from the first, the second, and the third central processor module respectively; the central processor module further connected to the associated microcontroller of said output module for transferring said output data to said output module; the output module further included a first, a second, and a third output circuit that are connected to said microcontrollers in a such manner that the first output circuit is connected to the first and to the third microcontroller for receiving said output data from the first and from the third central processor module, the second output circuit is connected to the second and to the first microcontroller for receiving said output data from the second and from the first central processor module, the third output circuit is connected to the third and to the second microcontroller for receiving said output data from the third and from the second central processor module; the output module further comprising a first, a second, and a third watchdog controller each of which is connected to the associated microcontroller for detecting the occurrence of a fault within said microcontroller as well as within the associated central processor module and for activating an alarm signal in the event that said microcontroller or said central processor module fails; the output circuit is further connected to the associated watchdog controller and connected to neighbor watchdog controllers for receiving said alarm signal from any of said watchdog controllers; means in the output circuit for providing its output as a logical product of output data received from two associated central processor modules, said output circuits connected to each other for generating system output as a logical sum of the outputs produced by said output circuits to provide a two-out-of-three vote among output data produced by three central processor modules; means in the output circuit for producing the output of said output circuit as a logical product of output data received from the associated central processor module and from neighbor central processor module if said alarm signal in each watchdog controller is not activated, means for generating said output by only using the output data received from the associated central processor module if at least one out of two alarm signals produced by the neighbor watchdog controllers is activated, and for disabling said output if alarm signal received from the associated watchdog controller is activated, thereby allowing the system to reconfigure from two-out-of-three voting configuration to a two-out-of-two voting configuration in the event that the associated central processor module fails, to a one-out-of-one voting configuration in the event that the associated and any neighbor central processor modules concurrently fail, and to the predetermined safe output condition in the event that each central processor module fails; wherein said means in the first output circuit for producing its output as a logic product of output data received by said output circuit from the first central processor module and from the third processor module if said alarm signal in each watchdog controller is not activated, and generates said output by only using the output data received from the first central processor module if at least one out of two alarm signals associated with second and third watchdog controllers is activated, and for disabling the output of said output circuit if the alarm signal associated with the first watchdog controller is activated; wherein said means in the second output circuit for producing its output as a logic product of output data received by said output circuit from the second central processor module and from the first processor module if said alarm signal in each watchdog controller is not activated, and generates said output by only using the output data received from the second central processor module if at least one out of two alarm signals associated with first and third watchdog controllers is activated, and for disabling the output of said output circuit if the alarm signal associated with the second watchdog controller is activated; wherein said means in the third output circuit for producing its output as a logic product of output data received by said output circuit from the third central processor module and from the second processor module if said alarm signal in each watchdog controller is not activated, and generates said output by only using the output data received from the third central processor module if at least one out of two alarm signals associated with first and second watchdog controllers is activated, and for disabling the output of said output circuit if the alarm signal associated with the third watchdog controller is activated; means in each microcontroller for reading status of the associated output circuit and disabling the output of said output circuit if a fault of said output circuit is discovered; means in each central processor module for reading status of the associated output circuit via the associated microcontroller and disabling the output of said output circuit via the associated microcontroller if a fault of said output circuit is discovered; means in each central processor module for reading status of the associated input circuit and disabling output data of said input circuit if a fault of said input circuit is discovered.

DESCRIPTION OF THE PREFERRED EMBODIMENTS

1. The concept of the Hybrid Triple Redundant Computer System (HTRC system)

Figure 1:
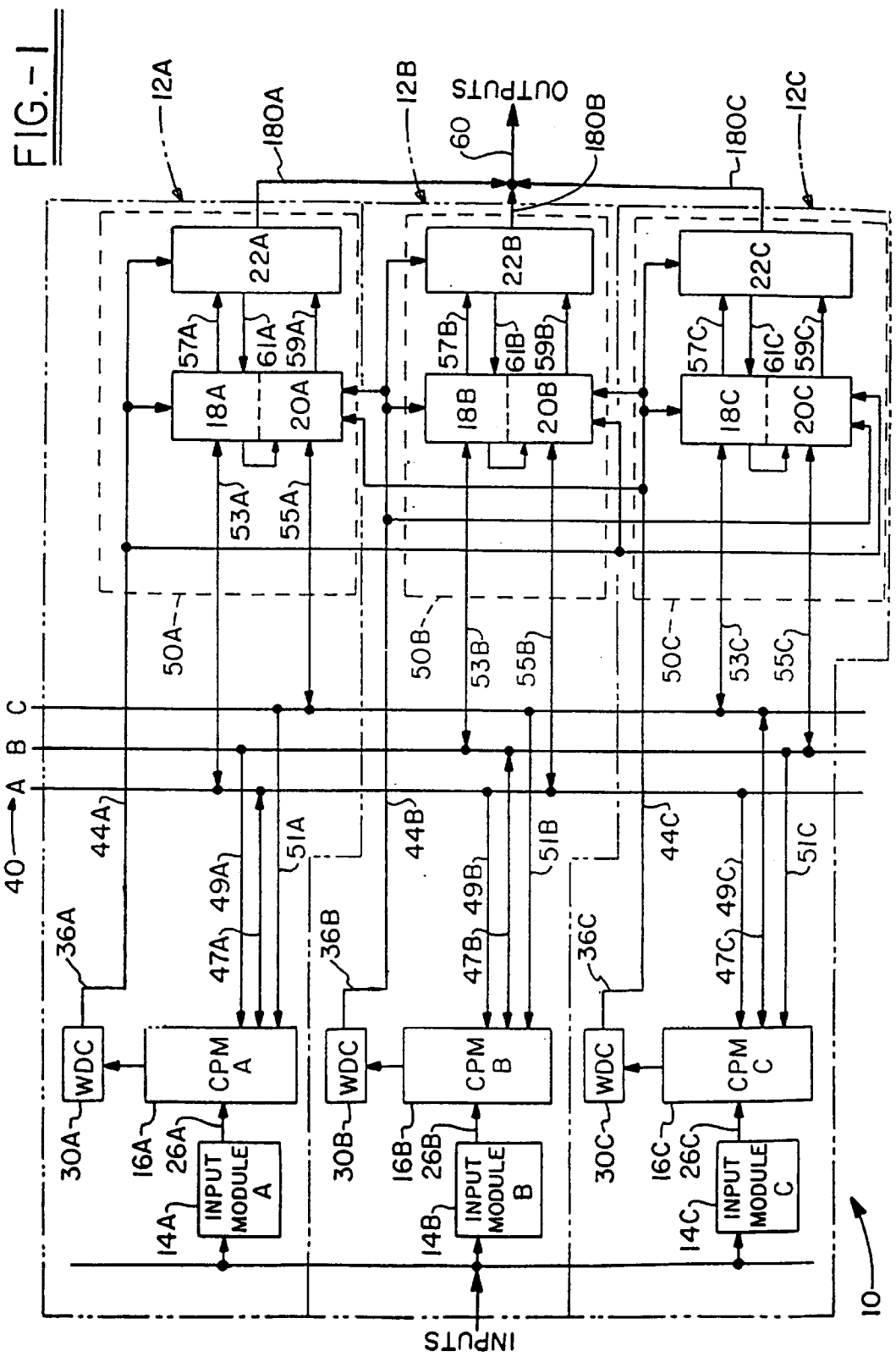
FIG. 1 is a block diagram of a hybrid triple redundant system according to the concepts of the present invention.
Figure 2:
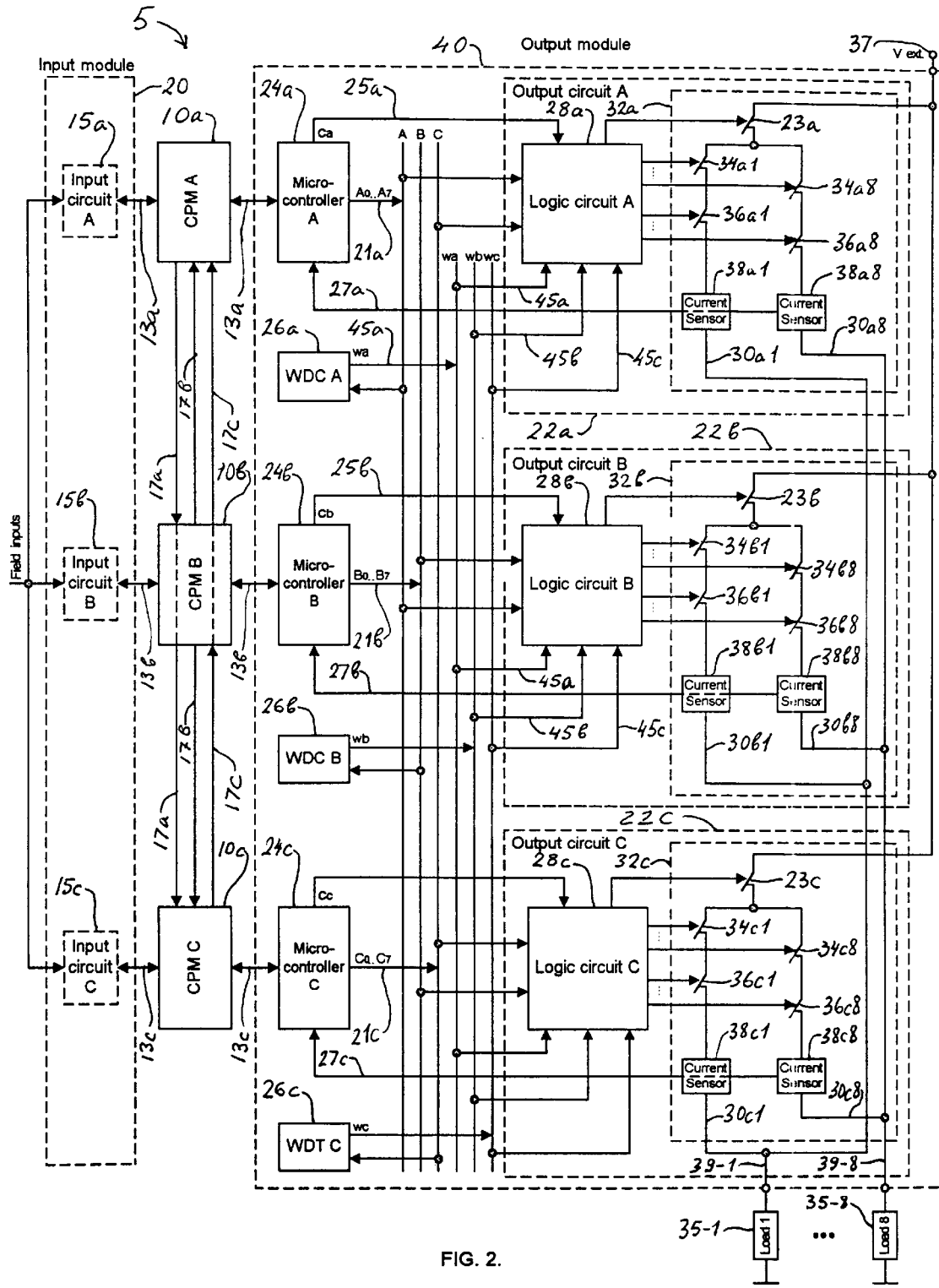
FIG. 2 is a block diagram of a second version of a hybrid triple redundant system according to the concepts of the present invention.

The concept of the presented in the exemplary HTRC system is shown in FIG.2 and generally indicated by the numeral 5. The system 5 includes three identical central processor modules 10A, 10B, 10C, an input module 20, and an output module 40. Additional I/O modules can also be included into the system 5 to expand the system 5. Each I/O module houses three I/O circuits respectively. Each input circuit 15 on the input module 20 reads the field data and passes that data to its respective central processor module 10 (CPM 10). The three central processor modules 10 operate in parallel as the members of a triad. The system 5 performs control functions on a cyclical basis. The period of operation cycle is the scan time, which is mostly composed of the time required for the I/O polling and of the time required to execute the application program. Input polling, however, is asynchronous and can overlap application program execution.

The input module 20 comprises three identical input circuits 15. They read the same process data and transmit this data to their mate CPM 10 over I/O buses 13a, 13b, and 13c. These buses 15 are used also for the communication between CPMs and associated output module 40. Separated serial links 17a, 17b, and 17c are used by the CPM 10 to communicate with two neighboring CPMs 10 in read only mode. Once per scan, the central processors 10 synchronize and each reads input data and diagnostic status of its neighbors. The CPM 10 uses a single transmitter to send copies of input data and diagnostic status to the neighboring CPMs 10. This ensures that the same data is received by each CPM 10. The CPM 10 calculates the middle value among three sets of analog input data if it operates with the analog input module 20. The CPM 10 performs two-out-of-three (2-of-3) software majority voting of digital input data when it works with the digital input module 20. These techniques allow the system to mask possible input transient failures that would propagate into the calculations. The CPM 10 then executes the application program and sends output data generated by this program to the output module 40.

For each I/O module 20 and 40, the system 5 can support an additional hot-spare module (not shown in FIG. 2), which takes control, if a fault is detected on the primary module 20 or 40 during operation. The hot spare module can occupy a position near the primary module. In addition, the system 5 provides the user with utilization of this position either for the hot-spare module or for the conventional non-spare module. This technique allows the user to double the amount of outputs for less responsible applications. Existing fault tolerant systems support hot-spare modules but they do not provide system operation capable of changing hot-spare and non-spare modules.

At first, we will consider the system 5 that comprises central processor modules 10 generating a single-bit output for each controlled point. Three central processor modules 10a, 10b, and 10c are synchronized before sending their single-bit outputs to the microcontrollers 24a, 24b, and 24c respectively. The digital output module 40 receives single-bit outputs from central processor module 10a, 10b and 10c over buses 13a, 13b and 13c respectively. The digital output module 40 then generates the single-bit system output 39 for each controlled point in accordance with the associated single-bit output. Each single-bit system output controls a process via actuators and final control elements (not shown in FIG. 2). This system configuration is primarily designated for operating as the Emergency Shutdown System (ESD) but it can also be in use for the critical ON/OFF control.

FIG. 2 shows that the output module 40 comprises three identical microcontrollers 24 each of which communicates with the associated central processor module 10 over the corresponding bus 13. The output module 40 further includes three identical watchdog controllers 26 and three identical output circuits 22a, 22b, and 22c each of which includes a logic circuit 28 and an output voter network 32. The watchdog controller 26 is devoted to automatically reset the associated CPM 10 in a case of software or hardware faults. The output module 40 also includes data buses 21a, 21b, and 21c that are used by the associated microcontrollers 24a, 24b, 24c respectively for transferring output data of the associated central processor modules 10 to the corresponding logic circuit 28. Each output voter networks 32 consists of multiple pairs of electronic valves 34 and 36 connected in series per each controlled point and provides for each point a corresponding output 30. The associated outputs 30 are connected together providing a system output 39 for the corresponding load 35. Each valve 34, 36 is controlled by the associated microcontroller over the corresponding logic circuit 28. The output 30 is de-energized when at least one valve in the associated pair of valves 34, 36 is in OFF condition. The voter network 32 also includes a fault recovery valve 23 that is normally in the permanent ON condition. When both valves 34 and 36 in series are ON, a current flows from a terminal 37 of a power supply over valves 23, 34, and 36 to the associated load 35. The corresponding system output 39 is then energized. The fault recovery valve 23 is controlled either by the CPM 10 via the associated microcontroller 24 or by the microcontroller 24 itself. The fault recovery valve 23 can be closed by the associated CPM 10 in the event that both valves 34 and 36 connected in series fail being in ON condition permanently. It will be shown more clearly later as the description proceeds. Each output voter circuit 32 also includes current sensors 38, each of which is connected in series with the associated pair of valves 34 and 36. The current sensors 38 generate feedback signals over lines 27 to inform the associated CPM 10 via the microcontroller 24 about the current flowing through valves 34, 36.

Figure 3:
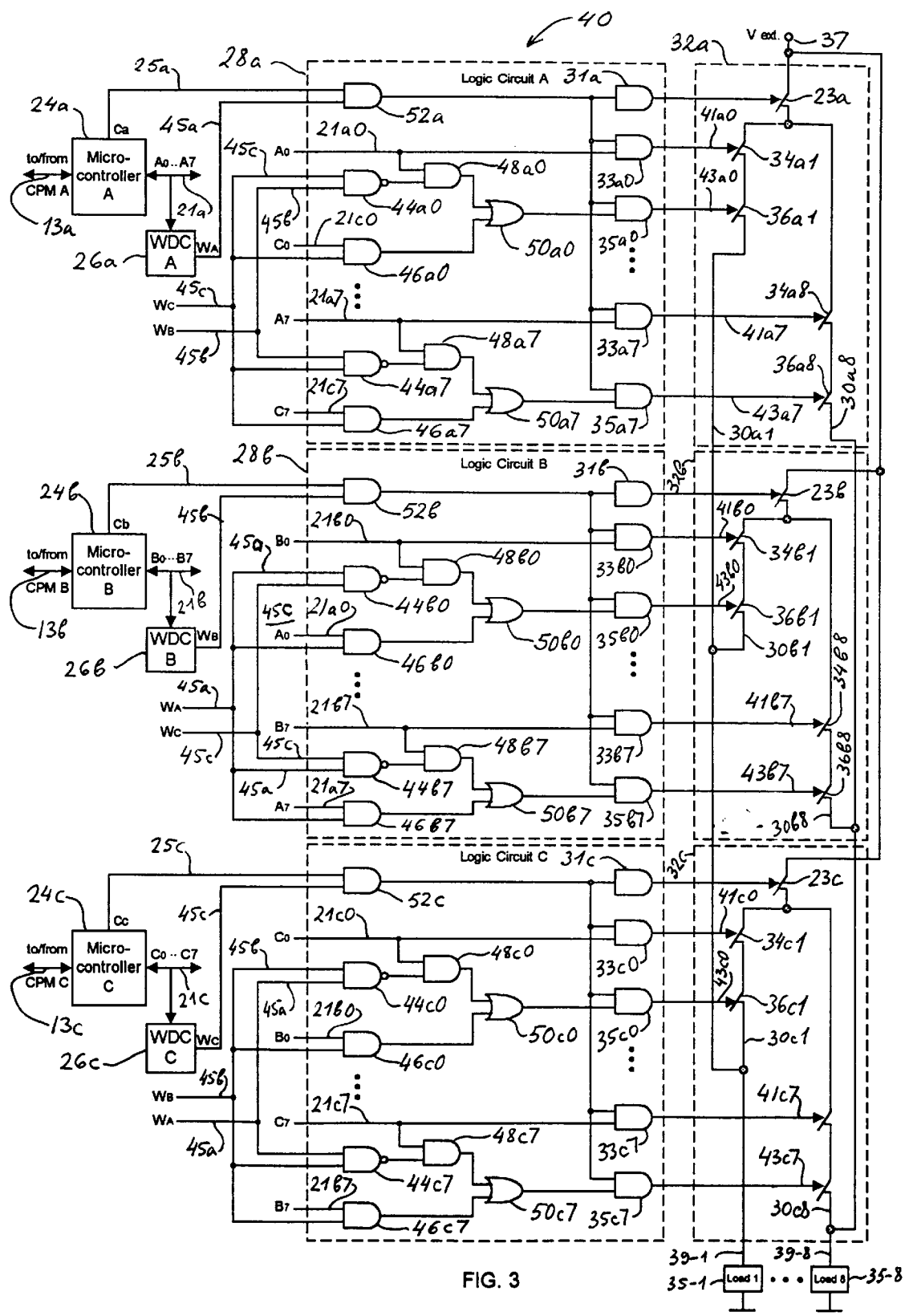
FIG. 3 is a block diagram showing the components of an output module according to the present invention.

More detailed scheme of the output module 40 is shown in FIG. 3. The logic circuit 28a comprises a plurality of first AND gates 48a0 ... 48a7, a first input of which is connected to the corresponding line 21a for receiving an associated single-bit output from the microcontroller 24a. The logic circuit 28a also includes a plurality of second AND gates 46a0 ... 46a7 and includes a plurality of OR gates gates 50a0 ... 50a7. A first input of each gate 46c is connected to the corresponding line 21c for receiving an associated single-bit output from the microcontroller 24c. The second inputs of gates 46a are connected together to an output 45c of the watchdog controller 26c for receiving an alarm signal from the watchdog controller 26c. The logic circuit 28a also comprises a plurality of NAND gates 44a0 . . . 44a7 that perform inverted AND operation on the 45c and 45b alarm signals that are produced by the watchdog controllers 26c and 26b respectively. The outputs of NAND gates 44a are connected to the second inputs of the gates 48a. The gates 48a0 . . .48a7 perform AND operation on the associated single-bit signals 21a0 . . . 21a7 and respective signals produced by the corresponding NAND gates 44a0 . . .44a7. The gates 50a0 . . .50a7, in turn perform OR operation on output signals produced by the respective gates 48a0 . . . 48a7 and 46a0 . . . 46a7. The single-bit signal 21a controls the associated valve 34a via the isolated driver 33a, while the output signal of the gate 50a controls the associated valve 36a via the isolated driver 35a. The fault recovery valve 23a is controlled via a gate 52a and the isolated driver 31a. The gate 52a performs AND operation with signals 25a and 45a produced by the microcontroller 24a and the watchdog controllers 26a respectively.

The circuit 28a operates with single-bit output data received over lines 21a and 21c from the microcontrollers 24a and 24c respectively. As can be appreciated, the neighboring logic circuits 28b and 28c include the same components as the logic circuit 28a. At the same time, the logic circuit 28b operates with single-bit output data received over lines 21b and 21a from the central processor modules 10b and 10a over the microcontrollers 25b and 25a respectively. In a similar way, the circuit 28c operates with single-bit output data received over lines 21c and 21b from the central processor modules 10c and 10b over the microcontrollers 25c and 25b respectively. Another difference between circuits 28 is that the NAND gates 44a, 44b, and 44c receive alarm signals 45c and 45b; 45a and 45c; and 45b and 45a respectively.

2. Theory of Operation

The system 5 operates as follows. In every cycle of the system 5 operation, the central processor module (CPM) 10 transfers single-bit output data to the associated microcontroller 24. The microcontroller 24, in turn, transmits single-bit output data over the bus 21 to the associated logic circuit 28 and to the logic circuit 28 associated with the neighbor microcontroller 24. The watchdog controller (WDC) 26 is automatically setting for the predetermined time interval. In every cycle of system 5 operation, central processor module 10 commands the microcontroller 24 to reset the associated WDC 26 by sending a selected command word to the associated microcontroller 24. The microcontroller 24, in response, resets the WDC 26 by setting a certain combination of single-bit outputs 21 on inputs of he associated WDC for a very short time to avoid impact of these outputs on conditions of the valves 34, 36. After reset, the WDC 26 automatically restores its set and then starts count again. In normal operation, each WDC 26 produces a logical "1" signal 45(W) that does not impact on the condition of the valves 34, 36, and 23, as well on the system outputs 39. In the event that the microcontroller 24 does not receive output data from the CPM 10 within the predetermined time interval due to software or hardware malfunction of this CPM, the WDC 26 cannot be cleared, and it overflows. In that case, the associated signal 45 is passed to a logical "0" condition that drives valves 34, 36, and 23 to the OFF condition via associated gate 52 and drivers 31, 33, and 35. Consequently, all outputs 30 of the associated output voter network (OVN) 32 are disabled. The same action takes place if the microcontroller 24 fails to reset the WDC 26 due to software or hardware malfunction of this microcontroller 24. This action protects system output 39 from the impact of possible incorrect output data in the event thathe associated CPM 10 or the associated microcontroller 24 fails.

In an alternative approach, the microcontroller 24 includes an internal timer that monitors the operation of the associated CPM 10 by verifying if the central processor executes all its programs properly within the predetermined time frame (PTF). The microcontroller 24 sets the internal timer for minimum and maximum time intervals that are acceptable for the execution of the CPM programs. In each cycle of the system operation, the microcontroller performs a special acceptance test, which tests the output data of the CPM control program and checks if this program is executed within the PTF. If the acceptance test rejects the control program output data or if the CPM program is not lie within the PTF, the respective microcontroller 24 generates an output signal 25 that disables all outputs 30 of the associated OVN 32. It prevents system output 39 from impact of possible incorrect output data in the event that the associated CPM 10 fails.

The microcontroller 24 periodically receives the status of the valves 34, 36 by reading feedback signals 27 of the current sensors 38. In the event, that both valves 34 and 36 in series in any of pairs fail ON concurrently it may lead to a dangerous system failure, since the system will not able to make a shutdown when it is required. The microcontroller 24 then transmits feedback signals 27 to the associated the CPM 10. In the event that a dangerous failure is discovered, the CPM 10 commands the associated microcontroller 24 to set the C signal on line 25 in the "0" condition. The output of the gate 52 then becomes "false". Therefore, the outputs of the associated drivers 31, 33 and 35 also become "false" driving the associated fault recovery valve 23 as well as all associated valves 34 and 36 to the OFF condition. Hence, all outputs 30 of the associated output voter network 32 are deenergized to avoid a dangerous system failure. The system output 39, however, is still controlled via the neighboring output voter networks 32. In an alternative approach, the microcontroller 24 drives the associated valves 34, 36, and 23 to the OFF condition itself. In this case, the microcontroller 24 sets "false" signal 25 as soon as the permanent ON condition of both valves 34 and 36 in any pair of these valves is discovered.

Each logic circuit 28 receives single-bit.output data from two associated CPMs 10, and it also receives alarm signals 45 from respective watchdog controllers 26. The logic circuit 28a, for example, receives single-bit output data over lines 21a and 21c from the central processor modules 10a and 10c respectively and receives 45a, 45b, 45c signals from WDC 26a, WDC 26b, and WDC 26c respectively. As shown in FIG. 3, each logic circuit 28 produces two sets of single-bit output signals 41a0 . . .41a7 and 43a0 . . . 43a7 on the outputs of the associated drivers 33a0 . . . 33a7 and 35a0 . . . 35a7 respectively. The outputs 41 and 43 of the drivers 33 and 35 control the corresponding valves 34 and 36. Logic circuits 28a, 28b, and 28c generates per any controlled point two signals Sa1, Sc2; Sb1, Sa2; Sc1, Sb2 respectively in accordance with logical equations:

$$Sa1 = A \quad Sc2 = C\hat{~}Wc + A\hat{~}(\overline{Wc\hat{~}Wb}) \tag{1}$$

$$Sb1 = B \quad Sa2 = A\hat{~}Wa + B\hat{~}(\overline{Wa\hat{~}Wc}) \tag{2}$$

$$Sc1 = C \quad Sb2 = B\hat{~}Wb + C\hat{~}(\overline{Wb\hat{~}Wa}) \tag{3}$$

In the equations 1, 2, and 3, A, B, and C represent any controlled point single-bit output data generated by CPMs 10a, 10b, and 10c respectively. Wa, Wb, and Wc represent signals 45a, 45b, and 45c respectively. Sa1, Sb1, Sc1 signals represent 41a, 41b, 41c signals respectively. Sc2, Sa2, Sb2 signals represent 43a, 43b, 43c, signals respectively. Underlines represent inverted values of the corresponding signals.

If both signals 41 and 43 produced by the logic circuit 28 are in a logical "1" condition then both corresponding valves 34 and 36 in series are ON and the associated load 35 is energized. The system output 39 for a taking point, consequently, will be ON i.e. energized if at least one out of three logic circuit 28 will produce "1" signals for both 41 and 43 outputs related to this point. The system output 39, therefore, is defined as a logical sum:

$$OUTPUT = Sa1\hat{\ }Sc2 + Sb1\hat{\ }Sa2 + \hat{\ }Sc1\hat{\ }Sb2 \qquad (4)$$

Taking the fault recovery valves 23 in consideration, fault recovering valves 23a, 23b, and 23c are controlled by signals 29a (Car), 29b (Cbr), 29c (Ccr) respectively in accordance with equations:

$$Car = Ca\hat{\ }Wa \quad Cbr = Cb\hat{\ }Wb \quad Ccr = Cc\hat{\ }Wc \qquad (5)$$

The equation (4), consequently, will transform to:

$$OUTPUT = Car\hat{\ }Sa1Sc2 + Cbr\hat{\ }Sb1\hat{\ }Sa2 + Ccr\hat{\ }Sc1\hat{\ }Sb2 \qquad (6)$$

After substituting equations (1), (2), (3), and (5) into equation (6) the final equation for the system output 39 becomes:

$$OUTPUT = Ca\hat{\ }Wa\hat{\ }A\hat{\ }$$
$$(C\hat{\ }Wc + A\hat{\ }(\underline{Wc\hat{\ }Wb})) +$$
$$Cb\hat{\ }Wb\hat{\ }B\hat{\ }(A\hat{\ }Wa + B\hat{\ }(\underline{Wa\hat{\ }Wc})) + +$$
$$Cc\hat{\ }Wc\hat{\ }C\hat{\ }(B\hat{\ }Wb + C\hat{\ }$$
$$(\underline{Wb\hat{\ }Wa})) \qquad (7)$$

In normal system operation, Ca=Cb=Cc="1", Wa=Wb=Wc="1". Consequently, for normal operation of the system 5, equation (7) is transformed to:

$$OUTPUT = A\hat{\ }C + B\hat{\ }A + C\hat{\ }B \qquad (8)$$

If any two out of three CPMs 10 set their single-bit output in a logical "1" condition for a selected point, the system output 39 will be ON (i.e. energized) with respect to this point. Similarly, if any two CPMs set their output in a logical "0" condition, the system output 39 will be OFF (i.e. de-energized) with respect to the taking point. Under normal operation, therefore, the system 5 performs two-out-of-three majority (2-of-3) vote among A, B, and C output data produced by CPM 10a, CPM 10b, and CPM 10c respectively for each point. Majority voting allows the system to mask some transient faults that could otherwise be left undetected. Permanent hardware and software faults as well as many transient faults are detected by system diagnostics. Now consider the system behavior in the presence of faults.

3. Faults Recovery 3.1. One CPM Fails

In the event, that CPM 10a fails due to software or hardware malfunction, the WDC 26a cannot be cleared and it overflows. In that case, the 45a signal is passed to a logical "false" state driving the fault recovery valve 23a as well as valves 34a1 . . . 34a8 and 36a1 . . . 36a8 to the OFF condition. It protects system output 39 from the impact of possible incorrect data produced by faulty CPM 10a. The 45a (Wa) "0" signal also drives outputs of the gates 44b0 . . . 44b7 and 44c0 . . . 44c7 located in logic circuits 28b and 28c respectively to a logical "1" condition. The "false" 45a signal on inputs 46b0 . . . 46b7 at the same time prevents output signals 21a produced by the faulty CPM 10a going to inputs of gates 50b0 . . . 50b7. Consequently, the logic circuit 28b will transmit single-bit output data to the corresponding valves 34b over lines 21b and to valves 36b over the corresponding gates 48b and 50b. The logic circuit 28c will transmit single-bit output data C over lines 21c to control the corresponding valves 34c and transmit a logical sum of single-bit data C and B to the corresponding valves 36c via gates 50. Since signals 25b (Cb), 25c (Cc), 45b (Wb) and 45c (Wc) will still be in a logical "1" condition, equation (7) will then transform to:

$$OUTPUT\ (CPM\ 10a\ \text{fails}) = B\hat{\ }B + C\hat{\ }(B + C) = B + C$$

Similarly, in the event that CPM B fails, the signal 45b becomes "0", while Ca, Cc, Wa and Wc signals will still be in a logical "1" condition and system output becomes as follows:

$$OUTPUT\ (CPM\ 10b\ \text{fails}) = A\hat{\ }(A + C) + C\hat{\ }C = A + C$$

The system output in the presence of CPM 10c fault is defined similarly:

$$OUTPUT\ (CPM\ 10c\ \text{fails}) = A\hat{\ }A + B\hat{\ }(B + A) = A + B$$

In the presence of a fault in one CPM 10, therefore, the system 5 is reconfigured, continuing to operate with two healthy CPMs 10 and it transforms from 2-of-3 vote to 2-of-2 vote. The 2-of-2 vote means that both CPM 10 that are still healthy must produce a logical "0" output to provide a shutdown. Notice that the faulty condition of the CPM 10 is indicated and the errant CPM 10 can be replaced online restoring the 2-of-3 vote without interruption of system operation. In that case, the application program is automatically loaded to a new CPM 10 from the healthy CPMs.

3.2. Two or Three CPMs fail Concurrently

In the event that CPM 10a and CPM 10b concurrently fail, the outputs 30a and 30b controlled by logic circuits 28a and 28b respectively are deactivated because both 45a (Wa) and 45b (Wb) signals become "0". The system output 39, however, will still controlled by the CPM 10c. Equation (7) will then transform to:

$$OUTPUT\ (CPM\ 10a\ \text{and}\ CPM\ 10b\ \text{fails}) = C\hat{\ }C = C$$

For other combinations of two faulty CPMs 10 the system outputs 39 are similarly defined due to the symmetrical system configuration, as:

$$OUTPUT\ (CPM\ 10a\ \text{and}\ CPM\ 10c\ \text{fails}) = B\hat{\ }B = B$$

$$OUTPUT\ (CPM\ 10b\ \text{and}\ CPM\ 10c\ \text{fails}) = A\hat{\ }A = A$$

In the presence of two faulty CPMs 10, the system 5, therefore, still operates with one healthy CPM 10. In the event that three CPMs fail at the same time, all outputs 30 of all voting networks 32 are deactivated, and the system 5 makes a safety shutdown. Therefore, it takes a minimum of three CPMs to shut the controlled process down.

3.3. The CPM and the Associated WDC Concurrently Fails

In the event that the CPM 10 fails, the associated WDC 26 may also fail in such a way that it will not be able to discover a fault of the CPM 10. In that case, the WDC 26 may hold the 45(W) signal in "1" condition despite the presence of a fault in the associated CPM 10. The microcontroller 24, therefore, may use wrong data received from the faulty CPM 10. If this data cannot be refreshed, it may represent wrong values shortly. In the event that the CPM 10 and the associated WDC 26 fail concurrently holding the 45(W) signal in "1" condition, the system output will be defined by equation (8):

$$OUTPUT = A\char`\^C + B\char`\^A + C\char`\^B$$

In that case, possible wrong data A, or B, or C are outvoted by 2-of-3 majority voting providing corrected system output 39. The system 5, therefore, still properly operates in the presence of concurrent CPM 10 and the associated WDC 26 faults.

3. 4. The CPM and the Neighbor WDC Concurrently Fail

Now consider a situation when CPM 10a and WDC 26b concurrently fail. In that event the 45a (Wa) signals is set to "0", while the 45b (Wb) signal can be in a permanent "0" or "1" state due to the WDC 26b fault. The system output 39 then given by:

$$OUTPUT = C\char`\^C = C, \text{ if } Wb = "0"$$

$$OUTPUT = B\char`\^B + C\char`\^(B+C) = B+C, \text{ if } Wb = "1"$$

The system outputs 39 for other possible combinations of a faulty CPM 10 and a faulty WDC 26 are defined similarly due to the symmetrical system configuration. All combinations of the CPM 10 and the WDC 26 faults, and the system output 39 for each combination are shown on tables 1, 2, and 3. In summary, the system 5 remains operational in the presence of up to two faulty components including the CPM 10 and the WDC 26.

TABLE 1

| CPM 10a fault Wa | WDC 26b fault Wb | WDC 26c fault Wc | System Output 39 |
|---|---|---|---|
| 0 | 0 | 1 | C |
| 0 | 1 | 0 | B |
| 0 | 1 | 1 | B + C |

TABLE 2

| CPM 10b fault Wb | WDC 26a fault Wa | WDC 26c fault Wc | System Output 39 |
|---|---|---|---|
| 0 | 0 | 1 | C |
| 0 | 1 | 0 | A |
| 0 | 1 | 1 | A + C |

TABLE 3

| CPM 10c fault Wc | WDC 26a fault Wa | WDC 26b fault Wb | System Output 39 |
|---|---|---|---|
| 0 | 0 | 1 | B |
| 0 | 1 | 0 | A |
| 0 | 1 | 1 | A + B |

The WDC 26 can also fail while the associated CPM 10 is still healthy. The WTD 26 can fail holding the 45(W) in the permanent "0" or "1" conditions. If the WDC 26 fails setting the W signal to the "0" condition while the associated CPM 10 is healthy, then the outputs 30 of the associated voter network 32 will be disconnected from the power supply 37. The system behavior, therefore, will be the same as when one CPM 10 fails. In a case that the WDC 26 fails holding its W signal in the "1" state permanently, the associated microcontroller 24 will still control outputs 30 properly. Notice that a faulty WDC 26 condition can be also discovered by the associated CPM 10 via the microcontroller 24. In that case, the system 5 may automatically switch control from the output module 40 consisting of faulty WDC 26 to the hot spare output module. It allows restoring the highest level of system fault tolerance without control interruption.

3.5. The Microcontroller Faults

In the event that the microcontroller 24 fails, the associated WDC 26 detects this fault and sets the 45(W) signal to the "0" condition. It deactivates all outputs 30 of the associated voter network 32. If two microcontrollers 24 fail concurrently, the outputs of two associated voter networks 32 are deactivated but the system 5 remains operational via the third healthy microcontroller 24. In the case that three microcontrollers 24 fail concurrently, the system 5 brings controlled process to a safe state by making a shutdown. In the presence of faulty microcontrollers 24, the system behavior, therefore, is similar to its behavior when the CPM-s 10 fail. All possible faults of the microcontrollers 24 and the corresponding system outputs 39 are shown in Table 4. As well as in the case when two CPMs 10 concurrently fail, the system 5 remains operational in the presence of two faulty microcontrollers 24. The shutdown may only occur if all three microcontrollers 24 concurrently fail.

TABLE 4

| Microcontroller 24a | Microcontroller 24b | Microcontroller 24c | Wa | Wb | Wc | System Output 39 |
|---|---|---|---|---|---|---|
| Good | Good | Good | 1 | 1 | 1 | A^C + B^A + C^B |
| Faulty | Good | Good | 0 | 1 | 1 | B + C |
| Good | Faulty | Good | 1 | 0 | 1 | A + C |
| Good | Good | Faulty | 1 | 1 | 0 | A + B |
| Faulty | Faulty | Good | 0 | 0 | 1 | C |
| Good | Faulty | Faulty | 1 | 0 | 0 | A |
| Faulty | Good | Faulty | 0 | 1 | 0 | B |
| Faulty | Faulty | Faulty | 0 | 0 | 0 | Safe failure (Shutdown) |

3.6. Microcontroller 24 and WDC 26 Concurrent Faults

In the event, that the microcontroller 24 fails and the associated WDC fails holding its 45(W) signal in "1" state, the system output 39 is given by equation (8):

$$OUTPUT = A\char`\^C + B\char`\^A + C\char`\^B \text{ (2-of-3 vote)}$$

In that case, data A, or B, or C may be wrong because the corresponding microcontroller fails. The wrong data, however, is outvoted by 2-of-3 majority voting. The system 5, therefore, still properly operates in the presence of concurrent faults in microcontroller 24 and associated WDC 26.

Another situations appear when the microcontroller 24 and the neighbor WDC fail concurrently. For instance, if microcontroller 24a and the WDC 26b fail, the 45a (Wa) signal is passed to the "0", while the 45b (Wb) signal can be in the permanent "0" or "1" state due to the WDC 26b fault. The system output 39 then given by:

$$OUTPUT = C\char`\^C = C, \text{ if } Wb = "0"$$

$$OUTPUT = B\char`\^B + C\char`\^(B+C) = B+C, \text{ if } Wb = "1"$$

The system output 39 for other possible combinations of the faulty microcontroller 24 and WDC 26 is defined similarly due to the symmetrical system configuration. All combinations of microcontroller 24, WDC 26 faults, and the system output 39 for each combination are shown in Tables 5, 6, and 7.

TABLE 5

| Microcontroller 24a fault Wa | WDC 24b fault Wb | WDC 24c fault Wc | System Output 39 |
|---|---|---|---|
| 0 | 0 | 1 | C |
| 0 | 1 | 0 | B |
| 0 | 1 | 1 | B + C |

TABLE 6

| Microcontroller 24b fault Wb | WDC 26a fault Wa | WDC 26c fault Wc | System Output 39 |
|---|---|---|---|
| 0 | 0 | 1 | C |
| 0 | 1 | 0 | A |
| 0 | 1 | 1 | A + C |

TABLE 7

| Microcontroller 24c fault Wc | WDC 26a fault Wa | WDC 26b fault Wb | System Output 39 |
|---|---|---|---|
| 0 | 0 | 1 | B |
| 0 | 1 | 0 | A |
| 0 | 1 | 1 | A + B |

3.7 The Logic Circuits 28, Drivers 31, 33, 35, and Electronic Valves 34, 36, and 23 Faults With reference to FIG.2 and FIG.3, now consider how possible faults occurring in logic circuits 28 and voter networks 32 impact the operation of the system 5. The logic circuit 28 generates two single bit outputs 41 and 43 for each point. For example, logic circuit 28a produces two output signals per point for the associated A and C data bits. A-bits and C-bits produce $41a0\ldots 41a7$ and $43a0\ldots 43a7$ signals on outputs of the drivers $33a0\ldots 33a7$ and $35a0\ldots 35a7$ respectively. The outputs $41a0\ldots 41a7$, $43a0\ldots 43a7$ in turn control the associated $34a1\ldots 34a8$ and $36a1\ldots 36a8$ valves. Some signals produced by the logic circuit 28 may represent wrong values due to faults of the corresponding gates. For example, the 43a0 signal may be wrong if the gate 50a0 fails giving a logical "1" output permanently. The associated 36a1 valve will then be stuck in the ON condition. The 34a1 valve, however, and hence the corresponding output 30a1 will still be controlled via the 41a0 signal. The similar situation occurs in the event that either driver 33a0 or driver 35a0 fails giving "1" output. In the event that either the 34a1 or 36a1 valve fails being ON permanently, the associated output 30a of the voter network 32a will still controlled via 36a1 or 34a1 valve respectively. In general, if up to three signals produced by different logic circuits 28 have failed each stuck in "1" state, the system remains operational. All possible combinations of being stuck in "1" signals related to logic circuits 28a and 28b and the corresponding system outputs 39 are shown in Table 8. Others possible combinations of faulty signals that involve the logic circuit 28c have a similar impact on the system output 39 due to symmetrical system 5 configuration.

Another situation takes place in the event that 41a0 signal fails in "0" state due to the driver 33a0 failure. In that case, the 34a1 valve will be stuck in the OFF condition. In that case, the associated output 30a of the voter network 32a will also be OFF. The system output 39-1, however, will still be controlled via valves 34b1, 36b1 and 34c1, 36c1. In that case, the system output 39 is given by:

$$OUTPUT = B\hat{\ }A + C\hat{\ }B = B\hat{\ }(A+C)$$

TABLE 8

| Faulty in "1" signals | System output 39 |
|---|---|
| 41a0 | $C + B\hat{\ }A + C\hat{\ }B = C + B\hat{\ }A$ |
| 43a0 | $A + B\hat{\ }A + C\hat{\ }B = A + C\hat{\ }B$ |
| 41b0 | $A\hat{\ }C + A + C\hat{\ }B = A + C\hat{\ }B$ |
| 43b0 | $A\hat{\ }C + B + C\hat{\ }B = B + A\hat{\ }C$ |
| 41a0 and 41b0 | $C + A + C\hat{\ }B = C + A$ |
| 41a0 and 43a0 | $C + B + C\hat{\ }B = C + B$ |
| 43a0 and 43a0 | $A + B + C\hat{\ }B = A + B$ |
| 43a0 and 41b0 | $A + A + C\hat{\ }B = A + C\hat{\ }B$ |
| 41a0, 41b0, and 41c0 | $C + A + B$ |

In the event, that any two signals produced by the different logic circuits 28 or different drivers 33, 35 concurrently fail in "0" state, the system output 39 will still be controlled by the third healthy logic circuit 28. If, for example the 41a0 and 41b0 signals have failed in "0" state, the system output 39-1 is given by:

$$OUTPUT = C0\hat{\ }\hat{\ }B0$$

Therefore, the system 5 requires three faulty "0" signals in the different logic circuits 28 for a shutdown. Similarly, if any two valves 34 or 36 or two valves 23 located in different voter networks 32 both fail stucking OFF, the system output 39 will still be controlled via the third healthy voter network 32. The same result takes place in the event that two drivers 33 or 35 related to different logic circuits 28 each produces a faulty "0" output. In the event that the fault recovery valve (FRV) 23 fails stucking ON, it will not impact to the system output 39 since this valve is continuously in the ON condition. Notice that the system 5 gracefully degrades after faults in any one or two components considered above located in the logic circuit or in the voter network. The degradation, however, is respected only to the output 39 of the point where the faults occur. All other outputs 39 still control the associated loads 35, performing 2-of-3 voting in accordance with the equation:

$$OUTPUT = A\hat{\ }C + B\hat{\ }A + C\hat{\ }B$$

A dangerous situation, however, may occur in the event that two outputs of the logic circuit 28 or outputs of drivers 33, 35 related to the same point both fail in "1" state permanently. For example, if 41a0 and 43a0 signals are stuck in the "1" state, then both 34a1 and 36a1 valves will be stuck ON causing the dangerous system failure since the system output 39-1 is continuously energized. This situation may also happen if 33a0 and 35a0 drivers or 33a0 driver and the 50a0 gate fail concurrently each producing a logical "1" signal. The 50a0 gate may also produce a faulty "1" output if either the gate 48a0 or the gate 46a0 fails in "1". A dangerous failure may also appear in the event that both 34a1 and 36a1 valves fail in the ON condition, while others elements of the logic circuit 28a and the associated drivers 33a, 35a are still healthy. Therefore, a dangerous failure may only occur if not less than two components in any logic circuit 28 or in the output voter network fail concurrently causing two associated valves 34 and 36 in series stuck in the ON condition.

The system 5, however, is able to quickly recover from a dangerous failure. The system 5 utilizes a fault recovery valve (FRV) 23 in each voting network 32 to do that. Referring to FIGS. 2 and 3, the microcontroller 24 monitors the status of each associated valve 34, 36 each scan by reading the feedback data generating by the associated current sensors 38. The current sensor 38 transmits a feedback signal 27 to the microcontroller 24 that in turn informs the associated CPM 10 if the valves 34, 36 are open or closed. In the event that a dangerous failure is discovered, the CPM 10 commands the associated microcontroller 24 to set the C signal on line 25 in the "0" condition. The output of the associated gate 52 is passed then to the "0" condition. Therefore, the outputs of the associated drivers 31, 33 and 35 are also passed to the "0" conditions driving the associated fault recovery valve 23 as well as all associated valves 34 and 36 to the OFF condition. Hence, all outputs 30 of the associated output voter network 32 are deenergized to avoid a dangerous system failure. The system outputs 39, however, are still controlled via the neighbor's output voter networks 32. In an alternative approach, the microcontroller 24 drives the associated valves 34, 36, and 23 to the OFF condition itself. In this case, the microcontroller 24 sets signal 25 in the "0" condition as soon as the permanent ON condition of both valves 34 and 36 in any pair of these valves is discovered.

For example, if the microcontroller 24a CPM 10a recognizes that both 34a1 and 36a1 valves are stuck in the ON condition, the microcontroller 24a transmits the status of these valves to the CPM 10b. The CPM 10A, in response, commands the microcontroller 24a to switch the FRV 23a to the OFF condition. The microcontroller 24a then sets 25a (Ca) signal to "0" condition. The 25a "0" signal forces the fault recovery valve 23a to the OFF condition via the gate 52a and the driver 31a. The 25a "0" signal also forces the valves 34a1 . . . 34a8 and 36a1 . . . 36a8 to the OFF condition for prevention undesired current that may flow through faulty 34a1, 36a1 valves to the ground terminal from the voter networks 28b and 28c. After that, the system 5 continues operate with output logic circuits 28b and 28c performing 2-of-2 voting for each controlled point. The system 5, therefore, is able recover after any two faults, that could lead to a dangerous failure. CPM 10b and CPM 10c perform similar actions as CPM 10a performs in the presence of up to two faults occurred in the associated logic circuits 28 or valves 34, 36. The system 5 remains operational even in the presence of two valves 34, 36 in series in any two output voter networks 32 being stuck in an ON condition. Therefore, the system 5 remains operational after four faults. In the event that all output voter networks 32 fail each having both valves 34, 36 in series in the permanent ON condition, the system 5 makes a shutdown.

3.8. Power Supply Faults

The presented HTRC system comprises three power supplies (PS) arranged in a triple redundant configuration (not shown in FIGS. 2, 3). Each part of the system 5 including the input circuit 15, the CPM 10, and the output circuit 22 derives power from a separate power rail and has an independent power regulator. In the event, that one or two PSs fail, the HTRC remains operational via the third PS. In the case that three PSs fail concurrently, the system outputs 39 are de-energized by driving all valves 34, 36 and 23 to the OFF condition via the conventional technique. The system then, makes a shutdown.

From the above description, it is evident that the presented HTRC system tolerates many combinations of two and even more component faults. In general, the system 5 remains operational in the presence of any two faulty components. The presented HTRC system is able to properly operate if at least one part including associated input circuit 15, CPM 10, microcontroller 24, watchdog controller 26, and the output circuit 22 is still healthy. Compared with existing TMR and 1oo2D systems, the presented HTRC provides significantly higher level of fault tolerance with respect to the persistent faults as well as to transient faults. The TMR system tolerates a single transient or persistent fault and it can tolerate a certain kind of two concurrent faults. The 1oo2D system tolerates a single persistent fault but it may produce a wrong output in case of undetected transient fault. The watchdog controller included into the HTRC system together with of 2-of-3 voting provides more effective fault discovering, therefore, the presented system provides correct outputs in the presence of many kinds of two transient faults occurring concurrently. In regard to the persistent hardware or software faults, the HTRC system tolerates any two concurrent faults and it can tolerate a certain kind of three or even four concurrent faults. The HTRC superiority is achieved by combining effective fault diagnostic and fault recovery means with the conventional 2-of-3 voting.

Having a higher level of fault tolerance provides the designer with a substantial decrease in the probability of both safe and dangerous system failures, hence it significantly improves reliability and availability of the presented HTRC system compared with the existing systems. This in turn enables the more effective protection of production loss due to a false shutdown and provides a higher degree of protection of personnel and equipment. Since many applications involve processes that are very expensive to shut down and start up, the presented HTRC system will provide a substantial economical benefit. It is also important to consider that if the HTRC using for emergency shutdown, it may decrease chances of disabling injuries and loss of life. These improvements are provided in the relatively inexpensive implementation of the presented HTRC system.

4. The Alternative Embodiment

Figure 4:
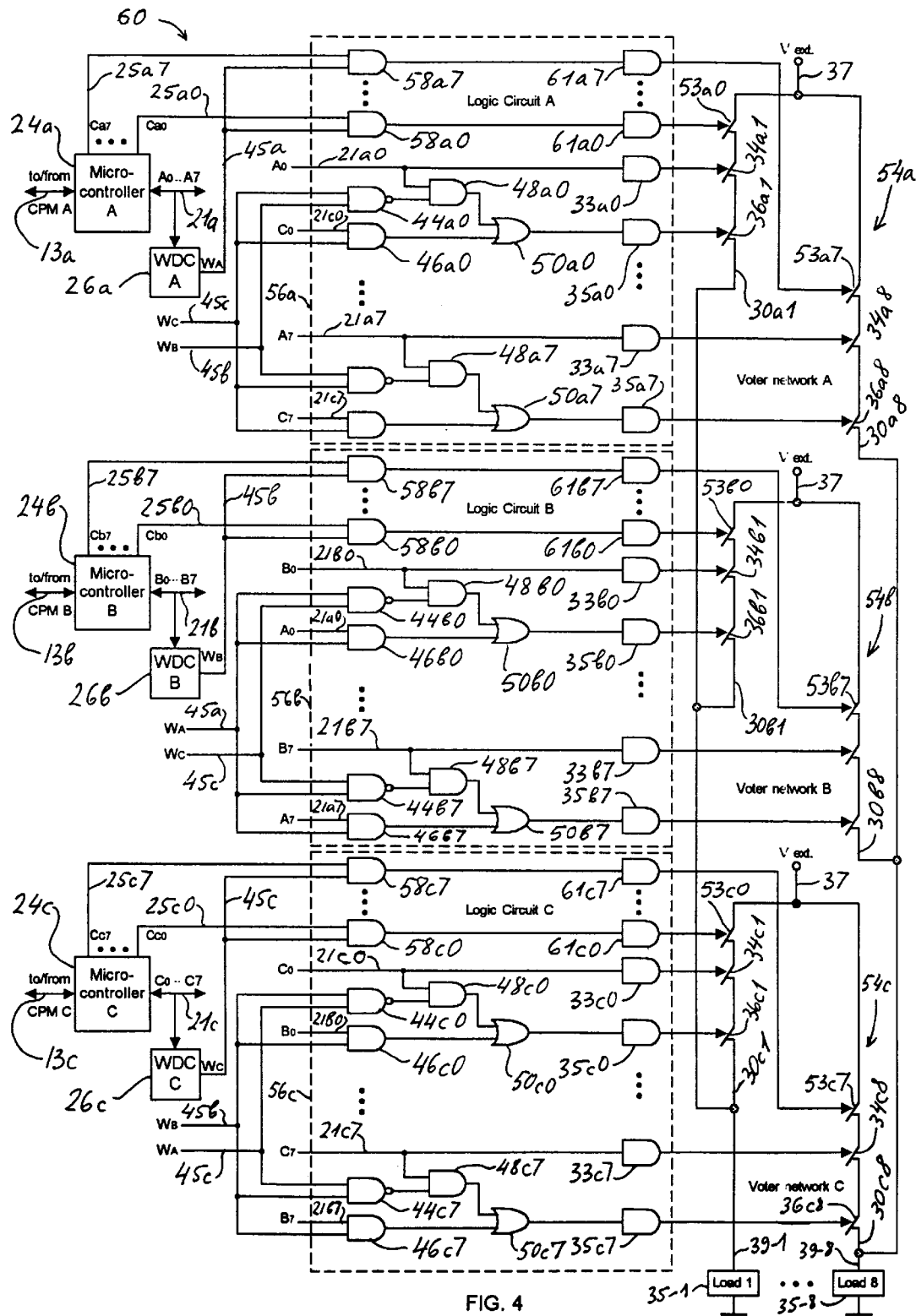
FIG. 4 is a block diagram showing the components of an output module according to an alternative embodiment of the present invention.

Referring to FIGS. 2 and 3, the output module 40 in each of output circuit 28 utilizes a single fault recovery valve (FRV) 23 that is normally in the permanent ON condition for each associated output voter network (OVN) 32. In the event that any two valves 34 and 36 in series become faulty sticking in the ON condition, the corresponding output 30 of the associated OVN 32 may be energized continuously. In this case, to avoid a dangerous failure, the system 5 drives the associated FRV 23 to the OFF condition, therefore, all outputs 30 of the associated OVN 32 are deenergized, even though all of them but one are still healthy. The system 5, therefore, after two such failures in any pair of valves 34 and 36 degrades from 2-of-3 to 2-of-2 voting for each controlled point despite only one pair of valves 34 and 36 having failed. The alternative embodiment of the output module is devoted to overcome this problem. The alternative embodiment of the output module 60 is shown in FIG. 4. Referring to FIGS. 3 and 4, the output module 60 includes the same components that the output module 40. The main difference between output modules 40 and 60 is that the output module 60 utilizes a different configuration of an output voter network (OVN) 54. Each output voter network 54 comprises a separate fault recovery valve (FRV) 53 for each controlled point. It allows the output module 60 to deactivate any output 30 independently from others outputs 30 via the associated FRV 53. The FRV 53 is normally in the permanent ON condition. In the comparison with the logic circuit 28a that utilizes a single gate 52a to control the associated FRV 23a, the logic circuit 56a has AND gates 58a0 . . . 58a7, each of which is connected to an associated driver 61a. Each driver 61a in turn is connected to the corresponding FRV 53a. The microcontroller 24 provides additional outputs 25a0 . . . 25a7, each of which is connected to a first input of the associated gate 58a. Seconds inputs of gates 58a are together connected to the output 45a of the associated watchdog controller 26a. The logic circuits 56b, 56c and their OVN-s 54b, 54c include similar components as the logic circuit 56a and the OVN 54a respectively due to symmetrical output module configuration.

The output module 60 operates similarly as the output module 40. In normal operation, the output module 60 performs 2-of-3 voting among the corresponding single-bit output data generating by central processor modules (CPM) 10 for each output 39. In the event that any CPM 10 or any microcontroller 24 fails, the associated watchdog controller 26 generates an alarm signal 45 that drives outputs of all associated gates 58 to the "false" state. Outputs of the associated drivers 61 then go to the "false" state too; consequently each FRV 53 is passed to the OFF condition. All outputs 30 of the associated OVN 54, therefore, are deactivated to avoid a possible negative impact of mentioned faulty components to the system outputs 39. The same action is provided in the case when any two CPM-s 10 or any two microcontrollers 24 fail concurrently. In the event that the FRV 53 fails remaining in ON condition in the presence of a fault occurred in the CPM 10 or in the microcontroller 24, the system remains operational. In this case, possible incorrect output data received by the associated logic circuit 56 from a faulty CPM 10 is outvoted by the neighboring CPM-s 10 that are still healthy. In general, the system 5 comprising the alternative output module 60 remains operational in the presence of any two faulty components mentioned above.

The alternative output module 60 operates differently than the output module 40 in the event that both valves 34 and 36 in the same pair become stuck in the faulty ON condition permanently. This failure can occur if both valves 34 and 36 or the corresponding components in the associated logic circuit 56 fail concurrently. The associated microcontroller 24 recognizes this fault and then drives the associated FRV 53 to the OFF condition by setting the corresponding output 25 to a "false" state. The "false" state of the input 25 is transferred over the corresponding gate 58 and driver 61 to the corresponding FRV 53 only that is passed then to the OFF condition. It allows the system to deactivate only that output 30, which is related to a pair of valves 34, 36 that both are stuck in the ON condition. The system comprising the alternative output module 60, therefore, degrades from 2-of-3 vote to 2-of-2 voting for only one system output 39 that is related to this faulty pair of valves 34, 36. All others outputs 39 are still produced by the system 5 as results of 2-of-3 voting. In this way, the system 5 comprising the alternative output module 60, therefore, provides better performance in comparison with the system 5 having output modules 40. The alternative output module 60, however, requires significantly higher amount of fault recovery valves and associated elements than the output module 40. If the presented system is assigned to control a lot of points, then a number of additional FRV-s is increased such that the amount of controlled points per output module must be correspondingly decreased to provide sufficient place for FRV-s. In this case, the system cost per controlled point, with the alternative module 60, therefore, can be considerable higher than the corresponding cost of the first described system 5. In view of the foregoing, it will now be seen that the above described invention satisfies the object of the present invention. It will be understood that various modifications may be made to the exemplary system described above without departing from the spirit of the present invention, and, thus, for an appreciation of the scope of the present invention, reference should be made to the following claims.

What is claimed is:

1. A hybrid multiple redundant computer system comprising:

a) an input module including a first, a second, and a third input circuit operating in parallel;

b) a first, a second, and a third central processor module operating in parallel, each of which is connected to the associated input circuit of said input module for receiving an input data from said input module and for using the input data as input to a control program to provide output data by execution of said control program;

c) an output module including a first, a second, and a third microcontroller for receiving said output data from the first, the second, and the third central processor module respectively;

d) the central processor module further connected to the associated microcontroller of said output module for transferring said output data to said output module;

e) the output module further including a first, a second, and a third output circuit that are connected to said microcontrollers in a such manner that the first output circuit is connected to the first and to the third microcontroller for receiving said output data from the first and from the third central processor module, the second output circuit is connected to the second and to the first microcontroller for receiving said output data from the second and from the first central processor module, the third output circuit is connected to the third and to the second microcontroller for receiving said output data from the third and from the second central processor module;

f) the output module further comprising a first, a second, and a third watchdog controller each of which is connected to the associated microcontroller for detecting the occurrence of a fault within said microcontroller as well as within the associated central processor module and for activating an alarm signal in the event that said microcontroller or said central processor module fails;

g) the output circuit is further connected to the associated watchdog controller and connected to neighbor watchdog controllers for receiving said alarm signal from any of said watchdog controllers;

h) means in the output circuit for providing its output as a logical product of output data received from two associated central processor modules, said output circuits connected to each other for generating system output as a logical sum of the outputs produced by said output circuits to provide a two-out-of-three vote among output data produced by three central processor modules;

i) means in the output circuit for producing the output of said output circuit as a logical product of output data received from the associated central processor module and from neighbor central processor module if said alarm signal in each watchdog controller is not activated, means for generating said output by only using the output data received from the associated central processor module if at least one out of two alarm signals produced by the neighbor watchdog controllers is activated, and for disabling said output if alarm signal received from the associated watchdog controller is activated, thereby allowing the system to reconfigure from two-out-of-three voting configuration to a two-out-of-two voting configuration in the event that the associated central processor module fails, to a one-out-of-one voting configuration in the event that the associated and any neighbor central processor modules concurrently fail, and to the predetermined safe output condition in the event that each central processor module fails;

j) wherein said means in the first output circuit for producing its output as a logic product of output data received by said output circuit from the first central processor module and from the third processor module if said alarm signal in each watchdog controller is not activated, and generates said output by only using the output data received from the first central processor module if at least one out of two alarm signals associated with second and third watchdog controllers is activated, and for disabling the output of said output circuit if the alarm signal associated with the first watchdog controller is activated;

k) wherein said means in the second output circuit for producing its output as a logic product of output data received by said output circuit from the second central processor module and from the first processor module if said alarm signal in each watchdog controller is not activated, and generates said output by only using the output data received from the second central processor module if at least one out of two alarm signals associated with first and third watchdog controllers is activated, and for disabling the output of said output circuit if the alarm signal associated with the second watchdog controller is activated;

l) wherein said means in the third output circuit for producing its output as a logic product of output data received by said output circuit from the third central processor module and from the second processor module if said alarm signal in each watchdog controller is not activated, and generates said output by only using the output data received from the third central processor module if at least one out of two alarm signals associated with first and second watchdog controllers is activated, and for disabling the output of said output circuit if the alarm signal associated with the third watchdog controller is activated;

m) means in each microcontroller for reading status of the associated output circuit and disabling the output of said output circuit if a fault of said output circuit is discovered;

n) means in each central processor module for reading status of the associated output circuit via the associated microcontroller and disabling the output of said output circuit via the associated microcontroller if a fault of said output circuit is discovered;

o) means in each central processor module for reading status of the associated input circuit and disabling output data of said input circuit if a fault of said input circuit is discovered.

2. The hybrid multiple redundant computer system of claim 1, wherein:

a) each microcontroller further comprising means for detecting the occurrence of a fault within the associated central processor module and for activating an alarm signal in the event that said central processor module fails;

b) each microcontroller further comprising an internal timer that is set for a predetermined time interval for activating said alarm signal in the event that said microcontroller does not receive output data of the associated central processor module within said predetermined time interval;

c) each microcontroller further comprising means for receiving a command from the associated central processor module to activate said alarm signal in the event that a fault of the associated output circuit is discovered by said central processor module.

3. The hybrid multiple redundant computer system of claim 1, wherein:

a) the output circuit comprising an associated logic circuit connected to the associated microcontroller for receiving output data from the associated central processor module via said microcontroller and connected to the neighbor microcontroller for receiving output data from the neighbor central processor module via said neighbor microcontroller;

b) the output circuit further comprising an output voter network connected to outputs of the associated logic circuit for producing a logic product of said outputs on the output of said output voter network, thereby producing said output as a logical product of the output data received by the associated logic circuit from two corresponding central processor modules;

c) the output of said output voter network connected with corresponding outputs of two neighbor output voter networks for producing system output as a result of two-out-of-three voting among output data of said three central processor modules;

d) the first output circuit comprising a first logic circuit that is connected to the first and to the third microcontroller for receiving output data from the first and from the third central processor modules via the first and the third microcontroller respectively, and transferring said output data to the associated output voter network to produce the output of said output voter network as a logical product of the output data received by said logic circuit from the first and the third central processor modules;

e) the second output circuit comprising the second logic circuit that is connected to the second and to the first microcontroller for receiving output data from the second and from the first central processor modules via the second and the first microcontroller respectively, and transferring said output data to the associated output voter network to produce the output of said output voter network as a logical product of the output data received by said logic circuit from the second and the first central processor modules;

f) the third output circuit comprising the third logic circuit that is connected to the third and to the second microcontroller for receiving output data from the third and from the second central processor modules via the third and the second microcontroller respectively, and transferring said output data to the associated output voter network to produce the output of said output voter network as a logical product of the output data received by said logic circuit from the third and second first central processor modules;

g) the logic circuit is further connected to the associated watchdog controller and connected to neighbor watchdog controllers for receiving said alarm signal from any of said watchdog controllers;

h) the logic circuit further comprising means for transferring output data of the associated and neighbor central processor module to the associated output voter network to produce the output of said output voter network as a logical product of the output data received by said logic circuit from the associated and neighbor central processor modules if said alarm signal in each watchdog controller is not activated, means for disabling the outputs of said output voter network if alarm signal received from the associated watchdog controller is activated, and for generating said output by only using the output data received from the associated central processor module if at least one out of two alarm signals produced by the neighbor watchdog controllers is activated;

i) said means in the first logic circuit for transferring output data of the first and third central processor module to the associated output voter network to produce the output of said output voter network as a logical product of the output data received by said logic circuit from the first and the third central processor module if said alarm signal in each watchdog controller is not activated, means for disabling the outputs of said output voter network if alarm signal received from the first watchdog controller is activated, for generating said outputs by only using the output data received from the first central processor module if at least one out of two alarm signals produced by the neighbor watchdog controllers is activated;

j) said means in the second logic circuit for transferring output data of the second and first central processor module to the associated output voter network to produce the output of said output voter network as a logical product of the output data received by said logic circuit from the second and the first central processor modules if said alarm signal in each watchdog controller is not activated, means for disabling the outputs of said output voter network if alarm signal received from the second watchdog controller is activated, and for generating said outputs by only using the output data received from the second central processor module if at least one out of two alarm signals produced by the neighbor watchdog controllers is activated;

k) said means in the third logic circuit for transferring output data of the third and second central processor module to the associated output voter network to produce the output of said output voter network as a logical product of the output data received by said logic circuit from the third and second first central processor modules if said alarm signal in each watchdog controller is not activated, means for disabling the outputs of said output voter network if alarm signal received from the third watchdog controller is activated, and for generating said outputs by only using the output data received from the third central processor module if at least one out of two alarm signals produced by the neighbor watchdog controllers is activated.

4. The hybrid multiple redundant computer system of claim 3, wherein:

a) the central processor module has means for periodically producing a single-bit output data, each bit of which corresponding to the system input;

b) the central processor module further has means for transferring said single-bit data to the associated logic circuit via the associated microcontroller;

c) the output voter network comprising multiple pairs of first and second electronic valves, within in each pair connected in series and each of said pairs connected by one side to an external power supply, and each of said pairs separately connected by other side to the output of said output voter network for providing a single-bit output that is energized if both first and second electronic valves ON and de-energized if at least one of said electronic valves OFF;

d) the logic circuit has means for transferring said single-bit data received from the associated and neighbor central processor module to the associated first and second electronic valve respectively if said alarm signal in each watchdog controller is not activated, means for driving both first and second electronic valves OFF to disable the outputs of the associated output voter network if alarm signal received from the associated watchdog controller is activated, and means for generating the output of the associated output voter network by using the single-bit data received from the associated central processor module if at least one out of two alarm signals produced by the neighbor watchdog controllers is activated;

e) the associated single-bit outputs of the neighbor output voter networks are connected together for generating system output as a logical sum of a logical product of said single-bit data to provide the system to perform two-out-of-three vote among said single-bit data produced by three central processor modules;

f) the first logic circuit has means for transferring said single-bit data received from the first and third central processor module to the associated first and second electronic valve respectively if said alarm signal in each watchdog controller is not activated, means for driving both first and second electronic valves OFF to disable the outputs of the associated output voter network if alarm signal received from the first watchdog controller is activated, and means for generating the output of the associated output voter network by using the single-bit data received from the first central processor module if at least one out of two alarm signals produced by the neighbor watchdog controllers is activated;

g) the second logic circuit has means for transferring said single-bit data received from the second and first central processor module to the associated first and second electronic valve respectively if said alarm signal in each watchdog controller is not activated, means for driving both first and second electronic valves OFF to disable the outputs of the associated output voter network if alarm signal received from the second watchdog controller is activated, and means for generating the output of the associated output voter network by only using the single-bit data received from the second central processor module if at least one out of two alarm signals produced by the neighbor watchdog controllers is activated;

h) the third logic circuit has means for transferring said single-bit data received from the third and the second central processor module to the associated first and second electronic valve respectively if said alarm signal in each watchdog controller is not activated, means for driving both first and second electronic valves OFF to disable the outputs of the associated output voter network if alarm signal received from the third watchdog controller is activated, and means for generating the output of the associated output voter network by only using the single-bit data received from the second central processor module if at least one out of two alarm signals produced by the neighbor watchdog controllers is activated.

5. The hybrid multiple redundant computer system of claim 4, wherein:

a) each microcontroller has a plurality of single-bit outputs for transferring said single-bit data received from the associated central processor module to the associated and to the neighbor logic circuit at the same time, each bit of said outputs connected to the corresponding input of the associated and the neighbor logic circuit;

b) the first logic circuit has a plurality of NAND gates, a first and a second input of each NAND gate is connected to the third and the second neighbor watchdog controllers respectively for receiving said alarm signals from each of said watchdog controllers and further comprising a plurality of first AND gates and a plurality of second AND gates, a first input of each first AND gate is connected to the corresponding single-bit output of the first microcontroller, a second input of each first AND gate is connected to the output of the corresponding NAND gate, a first input of each second AND gate is connected to the corresponding single-bit output of the third microcontroller, a second input of each second AND gate is connected to the third watchdog controller for receiving said alarm signal from said microcontroller;

c) the first logic circuit further comprising a first and a second drivers, an first input of each first driver is connected to the corresponding single-bit output of the first microcontroller, an output of the first and the second driver is connected to the corresponding first and second electronic valve respectively and further comprising a plurality of OR gates, an output of each OR gate is connected to the first input of the corresponding second driver, a first and a second input of each OR gate is connected to the output of the first AND gate and the second AND gate respectively for transferring single-bit outputs of the third microcontroller to the second inputs of the corresponding OR gates if the alarm signal producing by the third watchdog controller is true, for transferring said single-bit output of the first microcontroller to the first input of the corresponding OR gate if at least one out of two alarm signals produced by the second and third watchdog controllers is false, for producing a logical sum of the single-bit outputs generating by the first and third microcontrollers and transferring said logic sum to the corresponding second electronic valve via the corresponding OR gate if the alarm signal received from the second watchdog controllers is only false, and for transferring single-bit outputs producing by the first microcontroller to the corresponding second electronic valve via the corresponding OR gate if the alarm signal producing by the third watchdog controller is false;

d) the second logic circuit has a plurality of NAND gates, a first and a second input of each NAND gate is connected to the first and third watchdog controllers respectively for receiving said alarm signals from each of said watchdog controllers and further comprising a plurality of first AND gates and a plurality of second AND gates, a first input of each first AND gate is connected to the corresponding single-bit output of the second microcontroller, a second input of each first AND gate is connected to the output of the corresponding NAND gate, a first input of each second AND gate is connected to the corresponding single-bit output of the first microcontroller, a second input of each second AND gate is connected to the first watchdog controller for receiving said alarm signal from said microcontroller;

e) the second logic circuit further comprising a first and a second drivers, an first input of each first driver is connected to the corresponding single-bit output of the second microcontroller, an output of the first and the second driver is connected to the corresponding first and second electronic valve respectively and further comprising a plurality of OR gates, an output of each OR gate is connected to the first input of the corresponding second driver, a first and a second input of each OR gate is connected to the output of the first AND gate and the second AND gate respectively for transferring single-bit outputs of the first microcontroller to the second inputs of the corresponding OR gates if the alarm signal producing by the first watchdog controller is true, for transferring said single-bit output of the second microcontroller to the first input of the corresponding OR gate if at least one out of two alarm signals produced by the first and third watchdog controllers is false, for producing a logical sum of the single-bit outputs generating by the second and first microcontrollers and transferring said logic sum to the corresponding second electronic valve via the corresponding OR gate if the alarm signal received from the third watchdog controllers is only false, and for transferring single-bit outputs producing by the second microcontroller to the corresponding second electronic valve via the corresponding OR gate if the alarm signal producing by the first watchdog controller is false;

f) the third logic circuit has a plurality of NAND gates, a first and a second input of each NAND gate is connected to the second and first the watchdog controllers respectively for receiving said alarm signals from each of said watchdog controllers and further comprising a plurality of first AND gates and a plurality of second AND gates, a first input of each first AND gate is connected to the corresponding single-bit output of the third microcontroller, a second input of each first AND gate is connected to the output of the corresponding NAND gate, a first input of each second AND gate is connected to the corresponding single-bit output of the second microcontroller, a second input of each second AND gate is connected to the second watchdog controller for receiving said alarm signal from said microcontroller;

g) the third logic circuit further comprising a first and a second drivers, an first input of each first driver is connected to the corresponding single-bit output of the third microcontroller, an output of the first and the second driver is connected to the corresponding first and second electronic valve respectively and further comprising a plurality of OR gates, an output of each OR gate is connected to the first input of the corresponding second driver, a first and a second input of each OR gate is connected to the output of the first AND gate and the second AND gate respectively for transferring single-bit outputs of the second microcontroller to the second inputs of the corresponding OR gates if the alarm signal producing by the second watchdog controller is true, for transferring said single-bit output of the third microcontroller to the first input of the corresponding OR gate if at least one out of two alarm signals produced by the first and second watchdog controllers is false, for producing a logical sum of the single-bit outputs generating by the third and second microcontrollers and transferring said logic sum to the corresponding second electronic valve via the corresponding OR gate if the alarm signal received from the first watchdog controllers is only false, and for transferring single-bit outputs producing by the third microcontroller to the corresponding second electronic valve via the corresponding OR gate if the alarm signal producing by the second watchdog controller is false.

6. The hybrid multiple redundant computer system of claim 5, wherein:
   a) the output voter network further comprises a current sensor in each pair of the associated first and second electronic valves, said current sensor connected in series with said first and second electronic valves and connected to the associated microcontroller for producing a feedback data transmitted to the associated central processor module over the associated microcontroller to inform said central processor module about a value of current flowing through said first and second electronic valves, thereby allowing the associated microcontroller as well as the associated central processor module to get a status of the associated output voter network for discovering a possible faults occurred in said output voter network or in the associated logic circuit;
   b) means in each microcontroller for reading said feedback data from each of said current sensors simultaneously for discovering a possible fault in the associated output voter network as well as in the associated logic circuit;
   c) means in each microcontroller for transmitting the status of the associated output voter network to both neighbor microcontrollers;
   d) means in each microcontroller for disabling outputs of the associated output voter network in the event that said output voter network or the associated logic circuit fails.

7. The hybrid multiple redundant computer system of claim 6, wherein:
   a) the logic circuit further includes an additional AND gate, an output of said AND gate is connected to the second inputs of said first and second drivers, a first input of said AND gate is connected to the associated watchdog controller for receiving said alarm signal from said watchdog controller to drive said first and second electronic valves OFF if the alarm signal producing by the associated watchdog controller is false, thereby de-energizing all outputs of the associated output voter network from the system output in the event that the associated central processor or the associated microcontroller fails and its fault is recognized by the associated watchdog controller;
   b) the output voter network further includes a fault recovery valve that is normally in the ON condition, said fault recovery valve is connected by one side to an external power supply and connected by other side to one side of each pair of said first and second electronic valves, other side of each said pair is separately connected to the output of said output voter network;
   c) the logic circuit further includes a third driver, an input and an output of which is connected to the output of said AND gate and to the associated fault recovery valve respectively for driving said fault recovery valve OFF if the alarm signal producing by the associated watchdog controller is false, thereby de-energizing all outputs of the associated output voter network from the system output via said fault recovery valve in the event that the associated central processor or the associated microcontroller fails and its fault is recognized by the associated watchdog controller;
   d) the microcontroller further comprising a single-bit output connected to the second input of associated AND gate and said microcontroller has means for setting said single-bit output to a false state for driving the associated fault recovery valve OFF via the associated third driver, thereby de-energizing all outputs of the associated voter network from the system output in the event that both the first and the second electronic valves in any said pair concurrently fail in the ON condition permanently and this fault is discovered either by the microcontroller or by the associated central processor module.

8. The hybrid multiple redundant computer system of claim 6, wherein:
   a) the output voter network further comprises a plurality of fault recovery valves, each of which is normally in the ON state and each fault recovery valve is connected by one side to an external power supply and connected by other side to one side of the associated pair of said first and second electronic valves, other side of each said pair is separately connected to the output of said output voter network;
   b) the logic circuit further comprising a plurality of AND gates and a plurality of a third drivers, the output of each AND gate is connected to the input of the corresponding third driver, the output of each third driver in turn connected to the corresponding fault recovery valve, a first input of each said AND gate is connected to the associated watchdog controller for receiving said alarm signal from said watchdog controller to drive all said fault recovery valves OFF if the alarm signal producing by the associated watchdog controller is false, thereby de-energizing all outputs of the associated output voter network from the system output in the event that the associated central processor or the associated microcontroller fails and its fault is recognized by the associated watchdog controller;
   c) the microcontroller further comprising a plurality of single-bit outputs each of which is separately connected to the second input of the associated AND gate and said microcontroller has means for setting any of said single-bit outputs to a false state for driving only the corresponding fault recovery valve OFF via the associated third driver, thereby de-energizing only the corresponding output of the associated output voter network from the system output in the event that the corresponding first and second electronic valves both concurrently fail in the ON condition permanently and this fault is discovered either by said microcontroller or by the associated central processor module.

* * * * *